United States Patent
Johannsen

(10) Patent No.: US 9,705,862 B2
(45) Date of Patent: Jul. 11, 2017

(54) BROWSER ACCESS TO NATIVE CODE DEVICE IDENTIFICATION

(71) Applicant: BLUECAVA, INC., Irvine, CA (US)

(72) Inventor: Eric Alan Johannsen, San Juan Capistrano, CA (US)

(73) Assignee: BLUECAVA, INC., Irvine, CA (US)

(*) Notice: Subject to any disclaimer, the term of this patent is extended or adjusted under 35 U.S.C. 154(b) by 0 days.

(21) Appl. No.: 14/036,578

(22) Filed: Sep. 25, 2013

(65) Prior Publication Data

US 2014/0310773 A1 Oct. 16, 2014

Related U.S. Application Data

(63) Continuation of application No. PCT/US2012/033067, filed on Apr. 11, 2012.

(60) Provisional application No. 61/474,146, filed on Apr. 11, 2011.

(51) Int. Cl.
- *G06F 21/44* (2013.01)
- *H04L 29/06* (2006.01)
- *H04L 29/08* (2006.01)

(52) U.S. Cl.
CPC .......... *H04L 63/08* (2013.01); *H04L 63/0876* (2013.01); *H04L 67/04* (2013.01); *G06F 21/44* (2013.01)

(58) Field of Classification Search
CPC ..... H04L 63/0876; H04L 63/08; G06F 21/30; G06F 21/44; G06F 21/50
See application file for complete search history.

(56) References Cited

U.S. PATENT DOCUMENTS

| | | | |
|---|---|---|---|
| 5,956,483 A * | 9/1999 | Grate et al. | 709/203 |
| 6,216,153 B1 * | 4/2001 | Vortriede | G06F 17/30067 707/E17.01 |
| 7,236,957 B2 | 6/2007 | Smith | |
| 7,747,932 B2 | 6/2010 | Racunas et al. | |
| 8,127,033 B1 * | 2/2012 | Newstadt | G06F 17/30893 709/203 |
| 2001/0049718 A1 * | 12/2001 | Ozawa | 709/203 |
| 2003/0195971 A1 * | 10/2003 | Lai | H04L 29/06 709/229 |
| 2003/0218629 A1 | 11/2003 | Terashima | |
| 2004/0187027 A1 * | 9/2004 | Chan | 713/201 |
| 2005/0177495 A1 | 8/2005 | Smith | |
| 2009/0055749 A1 * | 2/2009 | Chatterjee et al. | 715/738 |

(Continued)

FOREIGN PATENT DOCUMENTS

| | | | |
|---|---|---|---|
| GB | 2494027 A * | 2/2013 | |
| WO | WO 01/55876 | 8/2001 | |

OTHER PUBLICATIONS

International Search Report and Written Opinion for PCT/US2012/033067, dated Jun. 22, 2012.

*Primary Examiner* — David Pearson
(74) *Attorney, Agent, or Firm* — Baker Botts L.L.P.

(57) ABSTRACT

A thick client installed on a client device includes a network protocol server that serves thin client requests for digital fingerprints of the client device. A thin client requests a digital fingerprint of the client device in which the thin client is executing by forming a URL according to a protocol served by the server of the thick client and addressing the URL to the local client device. The thick client returns the digital fingerprint as a response to the request from the thin client.

18 Claims, 3 Drawing Sheets

(56) References Cited

U.S. PATENT DOCUMENTS

| | | | |
|---|---|---|---|
| 2009/0100517 A1* | 4/2009 | Kim | G06F 21/554 726/22 |
| 2009/0164517 A1 | 6/2009 | Shields et al. | |
| 2010/0229224 A1* | 9/2010 | Etchegoyen | 726/5 |
| 2010/0311397 A1* | 12/2010 | Li | G06Q 20/32 455/414.1 |
| 2011/0016382 A1* | 1/2011 | Cahill et al. | 715/234 |
| 2011/0264770 A1* | 10/2011 | Kim | G06F 17/30893 709/219 |
| 2014/0025726 A1* | 1/2014 | Chen | 709/203 |

* cited by examiner

BROWSER ACCESS TO NATIVE CODE DEVICE IDENTIFICATION

CROSS-REFERENCE TO RELATED APPLICATIONS

The present application is a continuation of International Application Serial No. PCT/US2012/033067, filed Apr. 11, 2012 and published in English as WO 2012/142121 on Oct. 18, 2012, which claims priority to U.S. Provisional Application Ser. No. 61/474,146, filed Apr. 11, 2011, the contents of which are hereby incorporated by reference in their entireties.

BACKGROUND

1. Field

The disclosed subject matter relates generally to computer security and, more particularly, methods of and systems for enabling browser access to native code device identification for significantly more rigorous client authentication.

2. Description of the Related Art

The ubiquity of the Internet and the World Wide Web is reaching into nearly every aspect of people's lives, including those in which privacy and security are paramount. As more and more people use the Internet to conduct banking and to purchase goods, services, and licenses, it has become more and more crucial to guard against fraudulent transactions through the Internet. This includes the ability to accurately attribute user behavior and guard against various forms of fraud in the area of online digital advertising.

One approach is to authenticate the client device through which a transacting person is authenticated. The client device could include any type of computing device, such as a personal computer, smartphone, computer tablet, game console, as well as embedded systems that are integrated into other media devices (e.g., embedded systems in automobiles). Such ensures that the person's personal authentication data has not been stolen and used on a different client device. One method to authenticating the device is to collect specific information about hardware components of the device, including digital serial numbers, and to combine the information into a digital fingerprint.

In many on-line services, thin clients (e.g., content displayed in a conventional web browser from the server) are often preferable to thick clients (e.g., software installed in the client device). There are a number of reasons for this preference, such as greater user convenience as software installation is not required and the ability to maintain the software—including bug fixes and feature enhancements—at the server in just one location rather than supporting many different versions of the thick client installed in thousands or even millions of client devices.

However, thin clients do not have access to the sort of information included in a client device's digital fingerprint. Due to security concerns, web browsers are configured to limit thin clients' access to just a small portion of the content and hardware of the client device. For example, granting a thin client access to an entire hard drive or other persistent storage device would allow a malicious thin client to scan the hard drive for passwords and other sensitive information or to destroy information stored on the hard drive. Due to concerns regarding the security risks to the client device, thin clients are simply not permitted to gather enough information from the client device to robustly authenticate it. Generally speaking, any information of the client device to which a thin client would have access could be spoofed.

In addition, thin clients are generally not permitted to interact with thick clients or other programs on the client device. This is for the same security concern. For example, if a thin client could not scan a persistent storage device, the thin client could simply ask a resident file system browser to do that and report its findings.

What is needed is a way in which a thin client could have specific access to a thick client without also granting the thin client access to other programs on the client device.

SUMMARY

In accordance with the disclosed subject matter, a thick client installed on a client device includes a network protocol server that serves thin client requests for digital fingerprints of the client device. One thing that thin clients are universally allowed to do is to request resources using URLs according to any of a variety of network protocols. So, a thin client can request a digital fingerprint of the client device in which the thin client is executing by forming a URL according to a protocol served by the server of the thick client and addressing the URL to the local client device, e.g., by using the domain name "localhost" or the IPv4 address of 127.0.0.1 or any domain name or address associated with the local client device and known by the thin client.

Installation of the thick client in the local client device includes installation of the included server. Such installation includes configuration of the operating system of the client device to forward URLs addressed to a predetermined port of the client device to the server of the thick client. The access given to the thin client is very specific and limited. In particular, configuration of the client device to direct a specific type of URL request to the thick client does not give thin clients access to any other resources of the client device.

As a result, the thin client simply issues the URL in a conventional manner, exactly as the thin client would to retrieve an image or any other resource by its URL, and the operating system of the client device directs the request to the server of the thick client.

In response to the request, the thick client determines the digital fingerprint of the client device using its full access to detailed information of the client device, including digital serial numbers of installed hardware components. The thick client returns the digital fingerprint as a response to the request from the thin client.

Thus, the thin client has gained access to a digital fingerprint of the client device and the digital fingerprint contains information to which the thin client is denied direct access. As a result, the thin client can now rely on digital fingerprints that cannot easily be spoofed for effective and secure authentication of the client device.

BRIEF DESCRIPTION OF THE DRAWINGS

Other systems, methods, features and advantages of the disclosed subject matter will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features. In the drawings, like reference numerals may designate like parts throughout the different views, wherein:

DETAILED DESCRIPTION

Figure 2:
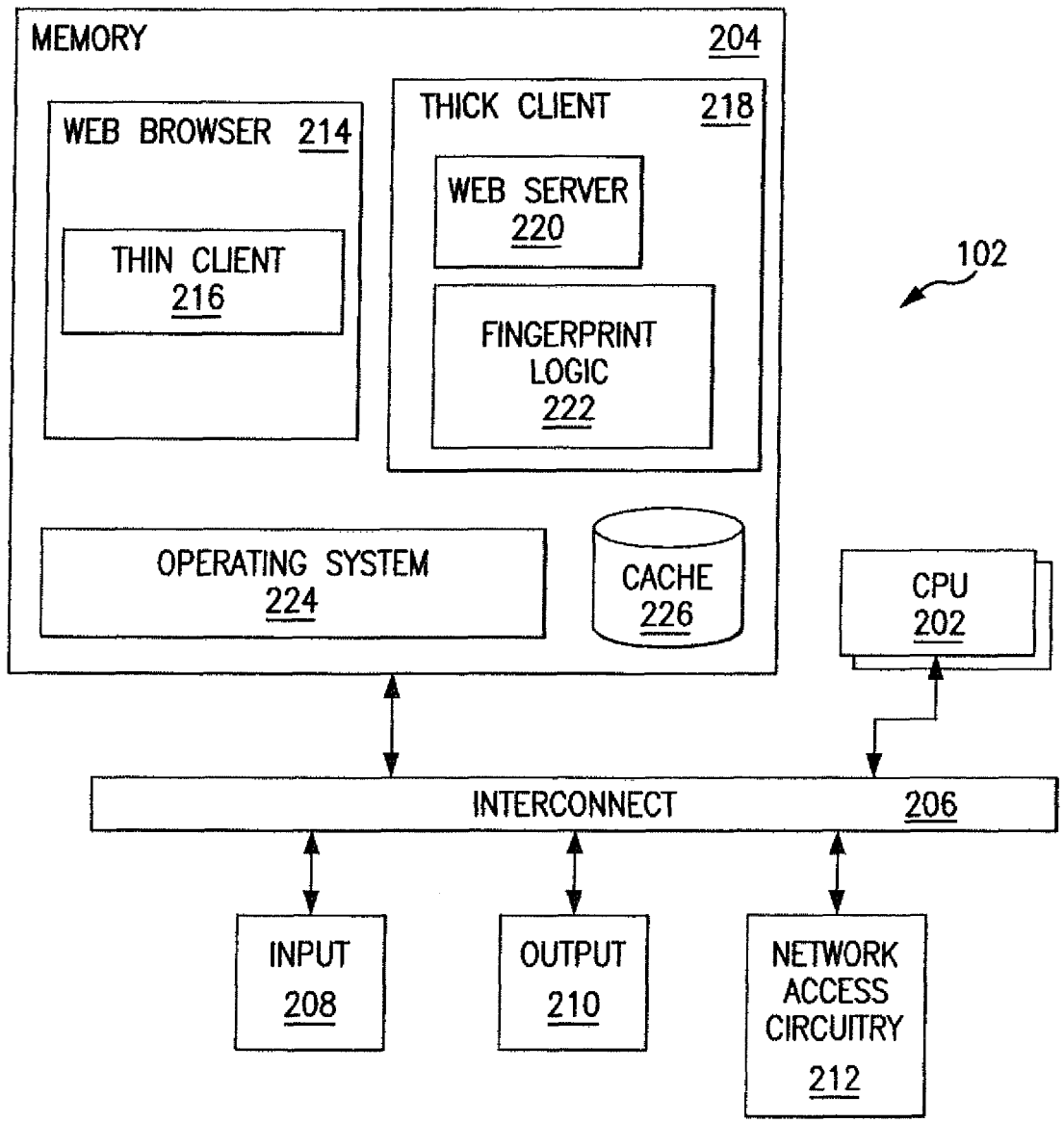
FIG. 2 is a block diagram showing the client computer of FIG. 1 in greater detail, including a thin client from the server computer of FIG. 1 executing in the client computer and a thick client installed in the client computer.

In accordance with the disclosed subject matter, a thick client 218 (FIG. 2) installed in a client device 102 includes a web server 220 to respond to requests from a thin client 216. In effect, thick client 218 provides access to itself so that thin clients do not require greater access to client device 102 than thin clients already have.

Figure 1:
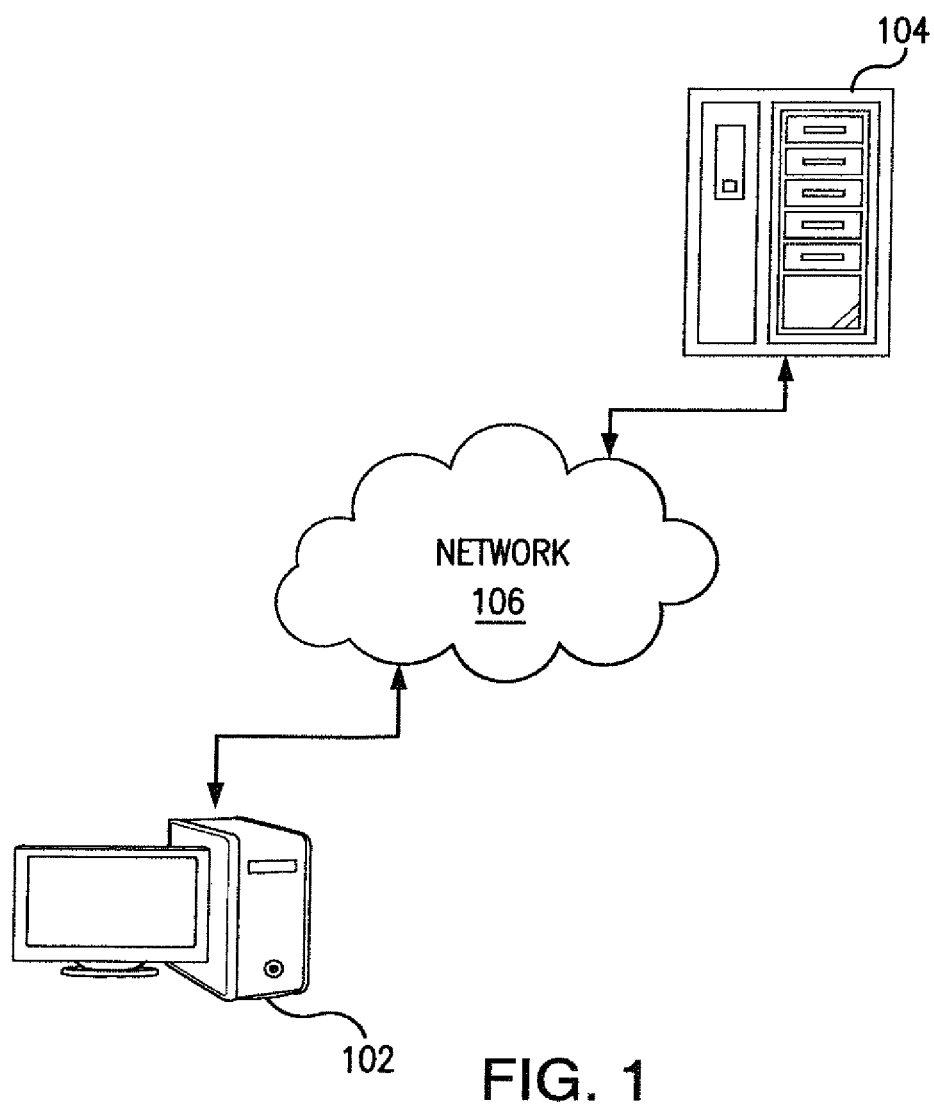
FIG. 1 is a diagram showing a client computer and a server computer that cooperate to provide digital fingerprint client device authentication in accordance with one embodiment of the disclosed subject matter.

FIG. 1 shows client device 102 connected to a server 104 through a wide area network 106 such as the Internet. Client device 102 includes a web browser 214 (FIG. 2) through which a human user of client device 102 can request services of server 104 (FIG. 1). While server 104 can respond with text, images, video, sound, or many other things, server 104 responds with a thin client 216 that is received by client device 102 and executed within web browser 214. In this illustrative embodiment, thin client 216 is at least partly executable code, such as ActiveX or javascript.

Client computer 102 is a computing device and includes one or more microprocessors 202 (collectively referred to as CPU 202) that retrieve data and/or instructions from memory 204 and execute retrieved instructions in a conventional manner. Memory 204 can include generally any computer-readable medium including, for example, persistent memory such as magnetic and/or optical disks, ROM, and PROM, and also volatile memory such as RAM.

CPU 202 and memory 204 are connected to one another through a conventional interconnect 206, which is a bus in this illustrative embodiment and which connects CPU 202 and memory 204 to one or more input devices 208, output devices 210, and network access circuitry 212. Input devices 208 can include, for example, a keyboard, a keypad, a touch-sensitive screen, a mouse, and a microphone. Output devices 210 can include, for example, a display—such as a liquid crystal display (LCD)—and one or more loudspeakers. Network access circuitry 212 sends and receives data through wide area network 106 (FIG. 1) such as the Internet and/or mobile device data networks.

A number of components of client computer 102 are stored in memory 204. In particular, web browser 214 and thick client 218 are each all or part of one or more computer processes executing within CPU 202 from memory 204 in this illustrative embodiment, but can also be implemented using digital logic circuitry. As used herein, "logic" refers to (i) logic implemented as computer instructions and/or data within one or more computer processes, and/or (ii) logic implemented in electronic circuitry. Cache 226 is data stored persistently in memory 204. In this illustrative embodiment, cache 226 is organized as a database.

Thick client 218 includes web server 220 and fingerprint logic 222. Like a conventional web server, web server 220 receives requests in the form of URLs (Uniform Resource Locations) and serves the request by returning the resource identified by each URL. Web server 220 can serve requests received according to any of a wide variety of network protocols, including HTTP, HTTPS, FTP, and NNTP, just to name a few. Unlike a conventional web server, web server 220 uses fingerprint logic 222 to access details of client devices 102 to provide digital fingerprint data of client device 102 to thin client 216.

To properly act as a web server, thick client 218—including web server 220—is installed in an operating system 224 of client device 102. Operating system 224 is all or part of one or more computer processes executing within CPU 202 from memory 204 that manages computer hardware resources of client device 102 and provides common services for efficient execution of various processes executing in client device 102. Installation of thick client 218 includes use of those common services to integrate thick client 218 into the ongoing operation of client device 102. Installation of thick client 218 includes installation of web server 220, which in turn includes registration of web server 220 within operating system 224 as a process listening on a predetermined port. The predetermined port in this illustrative embodiment is 8888. Accordingly, operating system 224 forwards URL requests specifying port 8888 to web server 220.

Figure 3:
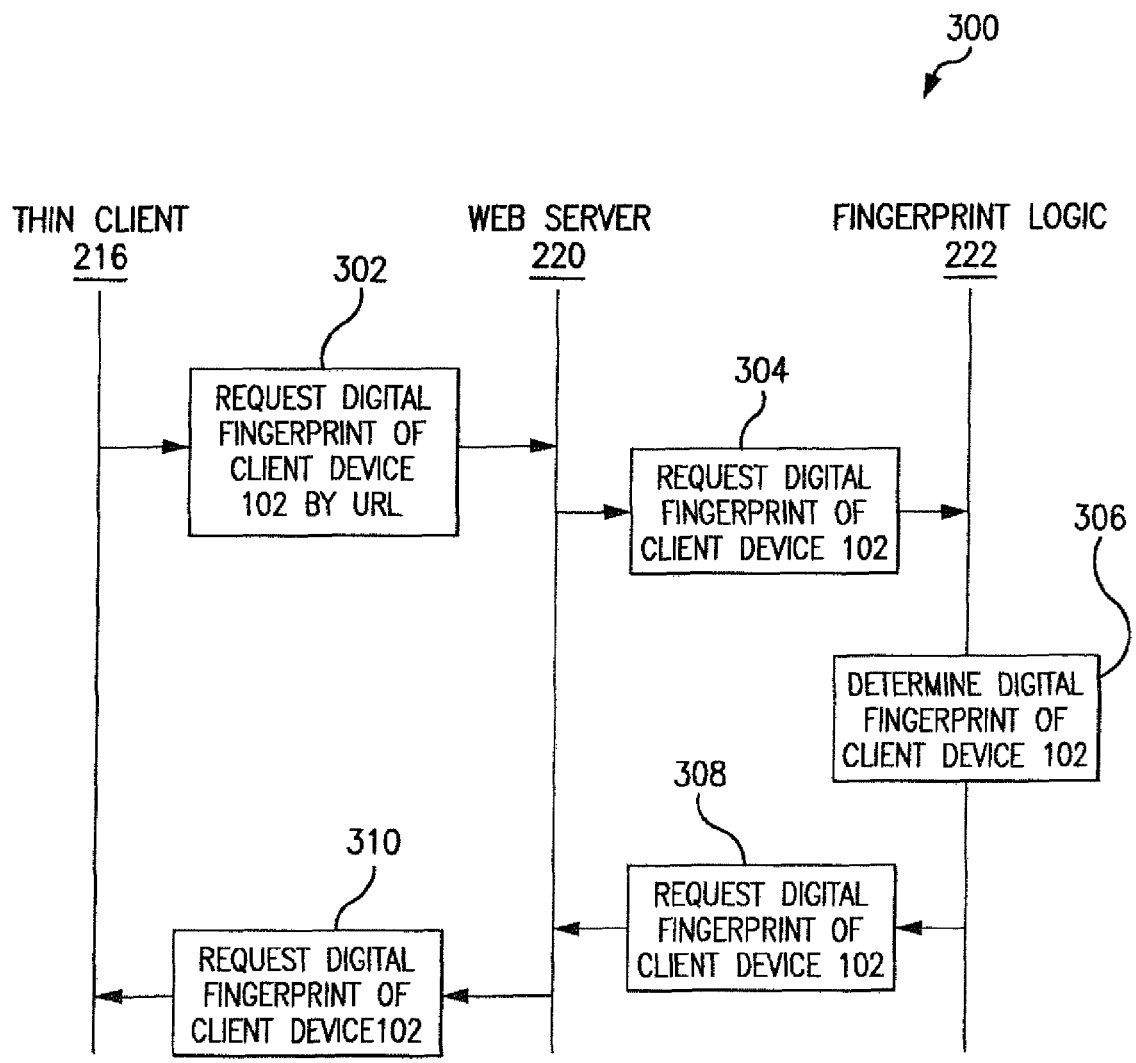
FIG. 3 is a transaction diagram illustrating one embodiment according to the disclosed subject matter of a method by which the thick client of FIG. 2 grants access to a digital fingerprint of the client computer to the thin client of FIG. 2.

Transaction flow diagram 300 (FIG. 3) illustrates the cooperation of elements of thick client 218 with thin client 216 to provide a digital fingerprint of client device 102. In step 302, thin client 216 requests the digital fingerprint of client device 102 by use of a URL addressed to client device 102 and to the predetermined port. The following is an example of such a URL:

http://localhost:8888/RequestThickClientFingerprint?Web-FingerprintID–123 (1)

URL (1) above specifies the protocol as HTTP with "http://", specifies the computer in which thin client is executing (i.e., client device 102) with "localhost", and specifies the predetermined port with ":8888". Of course, there are numerous other ways to address the URL to client device 102, such as IPv4 address 127.0.0.1 or any other IP address or domain name associated with client device 102. And, as noted above, HTTP is just one of many protocols that can be served by web server 220. As long as the one or more predetermined network protocols served by web server 220 and the one or more predetermined ports on which web server 220 listens is made known to server 104, server 104 can configure thin client 216 to use those predetermined protocols and ports.

Due to installation of thick client 218 in the manner described above, operating system 224 is configured to direct any requests addressed to the predetermined port at client device 102 to web server 220. Accordingly, the request of step 302 is directed by operating system 224 to web server 220.

The remainder of URL (1) is processed by web server 220. "RequestThickClientFingerprint" identifies a resource managed by web server 220 which thin client 216 would like access. In this case, "RequestThickClientFingerprint" identifies fingerprint logic 222. In addition, "WebFingerprintID=123" specifies data that fingerprint logic 222 can use to determine the proper digital fingerprint to return. In step 304, web server logic 220 sends a request to fingerprint logic 222 for the digital fingerprint whose identifier is "123".

In step 306, fingerprint logic 222 determines the digital fingerprint of client device 102. Digital fingerprints are known and are described, e.g., in U.S. Pat. No. 5,490,216 (referred to herein as the '216 Patent) which is incorporated herein by reference in its entirety. Since fingerprint logic 222 is part of thick client 218 and is installed in client device 102, fingerprint logic 222 has access to information pertaining to hardware and to other detailed aspects of client device 102 to which thin client 216 does not have access. For example, fingerprint logic 222 has access to such things as serial numbers of hardware components of client device 102 and can therefore include such serial numbers in a digital fingerprint. Thus, the digital fingerprint determined by fingerprint logic 222 in step 306 can include information not easily spoofed to reliably and accurately identify client device 102.

Fingerprint logic 222 can manage multiple fingerprints of various formats required by server 104 and various other servers. The fingerprint identifier of "123" specifies which particular digital fingerprint is to be determined by fingerprint logic 222. In this illustrative embodiment, fingerprint logic 222 stores previously determined fingerprints in cache 226 (FIG. 2) along with associated fingerprint identifiers to more quickly serve multiple requests for the same digital fingerprint.

In step 308 (FIG. 3), fingerprint logic 222 returns the digital fingerprint determined in step 306 to web server 220. In step 310, web server 220 returns the digital fingerprint to thin client 216.

Thus, thin client 216 has gained access to a digital fingerprint of client device 102 and the digital fingerprint contains information to which thin client 216 is denied direct access. As a result, thin client 216 can now rely on digital fingerprints that cannot easily be spoofed for effective and secure authentication of client device 102.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for providing data to a thin client executing in a computer, the method comprising:
    in a network protocol server executing in the computer:
        configuring the computer to direct requests of a predetermined type that are addressed to the computer to the network protocol server;
        receiving, from the thin client, a request of the predetermined type for the data;
    in a data server executing in the computer:
        in response to receiving the request for the data from the thin client:
            identifying a resource managed by the data server that can be used to produce the data requested by the thin client, wherein the data server identifies the resource from the data requested by the thin client in the request, and wherein the request does not indicate the resource to be used to generate the data requested by the thin client; and
            producing the data of the request using the resource managed by the data server, wherein the thin client is allowed access to the requested data and wherein the thin client is restricted access to the resource managed by the data server;
    in the network protocol server:
        providing the data produced by the data server to the thin client in response to the request.

2. The method of claim 1 wherein the data is a digital fingerprint derived from information of the computer to which the thin client does not have access.

3. The method of claim 1 wherein the network protocol server is a web server.

4. The method of claim 1 wherein the predetermined type of the request includes a predetermined port.

5. The method of claim 1 wherein the data server involves the implementation of fingerprint logic.

6. The method of claim 5 wherein the fingerprint logic stores the data in a cache.

7. A non-transitory computer readable medium useful in association with a computer which includes one or more processors and a memory, the computer readable medium including computer instructions which are configured to cause the computer, by execution of the computer instructions in the one or more processors from the memory, to provide data to a thin client executing in the computer by at least:
    in a network protocol server portion of the computer instructions:
        configuring the computer to direct requests of a predetermined type that are addressed to the computer to the network protocol server portion;
        receiving, from the thin client, a request of the predetermined type for the data;
    in a data server portion of the computer instructions:
        in response to receiving the request for the data from the thin client:
            identifying a resource managed by the data server that can be used to produce the data requested by the thin client, wherein the data server identifies the resource from the data requested by the thin client in the request, and wherein the request does not indicate the resource to be used to generate the data requested by the thin client; and
            producing the data of the request using the resource managed by the data server, wherein the thin client is allowed access to the requested data and wherein the thin client is restricted access to the resource managed by the data server;
    in the network protocol server portion of the computer instructions:
        providing the data to the thin client in response to the request.

8. The computer readable medium of claim 7 wherein the data is a digital fingerprint derived from information of the computer to which the thin client does not have access.

9. The computer readable medium of claim 7 wherein the network protocol server portion includes computer instructions for a web server.

10. The computer readable medium of claim 7 wherein the predetermined type of the request includes a predetermined port.

11. The computer readable medium of claim 7 wherein the data server portion includes computer instructions for fingerprint logic.

12. The computer readable medium of claim 11 wherein the fingerprint logic stores the data in a cache.

13. A computer system comprising:
    at least one microprocessor;
    a computer readable medium that is operatively coupled to the microprocessor; and
    a thick client (i) that executes in the microprocessor from the computer readable medium and (ii) that, when executed by the microprocessor, causes the computer to provide data to a thin client executing in the computer by at least:
        in a network protocol server portion of the thick client:

configuring the computer to direct requests of a predetermined type that are addressed to the computer to the network protocol server portion;

receiving, from the thin client, a request of the predetermined type for the data;

in a data server portion of the thick client:
   in response to receiving the request for the data from the thin client:
      identifying a resource managed by the thick client that can be used to produce the data requested by the thin client, wherein the data server identifies the resource from the data requested by the thin client in the request, and wherein the request does not indicate the resource to be used to generate the data requested by the thin client; and
      producing the data of the request using the resource managed by the thick client, wherein the thin client is allowed access to the requested data and wherein the thin client is restricted access to the resource managed by the thick client;

in the network protocol server portion of the thick client:
   providing the data to the thin client in response to the request.

14. The computer system of claim 13 wherein the data is a digital fingerprint derived from information of the computer to which the thin client does not have access.

15. The computer system of claim 13 wherein the network protocol server portion is a web server.

16. The computer system of claim 13 wherein the predetermined type of the request includes a predetermined port.

17. The computer system of claim 13 wherein the data server portion involves the implementation of fingerprint logic.

18. The computer system of claim 17 wherein the fingerprint logic stores the data in a cache.

* * * * *